(12) United States Patent
Heslouis et al.

(10) Patent No.: US 11,460,717 B2
(45) Date of Patent: Oct. 4, 2022

(54) SET OF OPHTHALMIC LENSES

(71) Applicant: Essilor International, Charenton-le-Pont (FR)

(72) Inventors: Melanie Heslouis, Charenton-le-Pont (FR); Carlos Rego, Charenton-le-Pont (FR); Cyril Guilloux, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 251 days.

(21) Appl. No.: 16/759,029

(22) PCT Filed: Nov. 27, 2018

(86) PCT No.: PCT/EP2018/082630
§ 371 (c)(1),
(2) Date: Apr. 24, 2020

(87) PCT Pub. No.: WO2019/105906
PCT Pub. Date: Jun. 6, 2019

(65) Prior Publication Data
US 2020/0278565 A1 Sep. 3, 2020

(30) Foreign Application Priority Data

Nov. 30, 2017 (EP) ..................... 17306660

(51) Int. Cl.
*G02C 7/02* (2006.01)
*G02C 7/06* (2006.01)

(52) U.S. Cl.
CPC ............ *G02C 7/027* (2013.01); *G02C 7/02* (2013.01); *G02C 7/063* (2013.01); *G02C 2202/08* (2013.01)

(58) Field of Classification Search
CPC ...... G02C 7/027; G02C 2202/08; G02C 7/02; G02C 7/024; G02C 7/06; G02C 7/061; G02C 7/063
See application file for complete search history.

(56) References Cited

U.S. PATENT DOCUMENTS 3,960,442 A 6/1976 Davis et al.
2002/0039171 A1* 4/2002 Shtrayanagi ............. G02C 7/02
351/178

(Continued)

FOREIGN PATENT DOCUMENTS

EP 2 028 527 A1 2/2009
EP 2 246 729 A1 11/2010

(Continued)

OTHER PUBLICATIONS

International Search Report and Written Opinion dated Jan. 18, 2019 in PCT/EP2018/082630 filed on Nov. 27, 2018.

(Continued)

*Primary Examiner* — Jordan M Schwartz
(74) *Attorney, Agent, or Firm* — Oblon, McClelland, Maier & Neustadt, L.L.P.

(57) ABSTRACT

A set of ophthalmic lenses is described where each ophthalmic lens has at a point of optical reference a maximum power and meets an optical performance criterion in standard wearing conditions, wherein the range of maximum powers of the set of ophthalmic lenses is greater than or equal to 10 D, and all the ophthalmic lenses of the set of ophthalmic lenses have been manufactured from a set of semi-finished lens blank, each semi-finished lens blank having the same base curve.

14 Claims, 5 Drawing Sheets

(56) References Cited

U.S. PATENT DOCUMENTS

| | | | |
|---|---|---|---|
| 2004/0099972 A1* | 5/2004 | Morris | B29D 11/00009 |
| | | | 264/1.32 |
| 2006/0050235 A1* | 3/2006 | Meron | G02C 7/061 |
| | | | 351/159.42 |
| 2008/0143959 A1* | 6/2008 | Bourdoncle | G02C 7/028 |
| | | | 351/159.42 |
| 2008/0198325 A1* | 8/2008 | Bonnin | G02C 7/06 |
| | | | 351/159.42 |
| 2010/0283966 A1 | 11/2010 | Colas et al. | |
| 2012/0188504 A1 | 7/2012 | Petignaud et al. | |
| 2015/0131056 A1 | 5/2015 | Paille et al. | |
| 2017/0199395 A1* | 7/2017 | Baudart | G02C 7/028 |

FOREIGN PATENT DOCUMENTS

| | | |
|---|---|---|
| EP | 2 669 732 A1 | 12/2013 |
| WO | WO 2015/110432 A1 | 7/2015 |

OTHER PUBLICATIONS

Mo Jalie, "Base curve selection (compilation of cases)" In: "Ophthalmic Lenses and Dispensing", Jan. 1, 2008, Elsevier. GB, XP055458313, p. 33-35, 67-68, 111-112, 125-126 (total 9 pages) ISBN: 978-0-7506-8894-9.

* cited by examiner

SET OF OPHTHALMIC LENSES

TECHNICAL FIELD

The invention relates to a set of ophthalmic lenses, each ophthalmic lens of said set having at a point of optical reference a maximum power and each ophthalmic lens meeting an optical performance criterion.

The invention further relates to a method, for example implemented by computer means, for determining a set of ophthalmic lenses that can be manufactured from a semi-finished lens blank and to method of ordering an ophthalmic lens adapted for a wearer from an ophthalmic lens provider.

BACKGROUND OF THE INVENTION

An optical lens is generally manufactured in accordance with wearer specifications. In the case, for example, of an ophthalmic lens for the correction or improvement of eyesight, the ophthalmic lens is manufactured according to a wearer prescription corresponding to the visual requirements of that wearer. In addition, the shape and size of the spectacle frame supporting the ophthalmic lens may be taken into account. At least one of the surfaces of the ophthalmic lens is processed to provide in combination with the opposite surface an optical function according to the wearer prescription. The contour of the ophthalmic lens may be edged according to the shape of the spectacle frame on which the ophthalmic lens is to be mounted.

An optical lens is generally manufactured from an optical lens blank such as a semi-finished lens blank. A semi-finished lens blank generally has two opposing surfaces at least one of which is unfinished.

A semi-finished lens blank is selected from a set of different semi-finished lens blanks Generally, the semi-finished lens blank is selected from the set of semi-finished lens blanks based on the prescription of the wearer and optical performance criteria.

The unfinished surface of the lens blank is machined according to the wearer's prescription to provide the required surface of the optical lens. An optical lens having finished back and front surfaces is often referred to as an uncut optical lens. The uncut optical lens is edged according to a shape of a spectacle frame of the optical lens in order to obtain an edged or cut optical lens.

The existing lens manufacturing process requires having a set of different semi-finished lens blanks leading to storage and logistic costs.

Therefore, it appears that there is a need to optimize the set of semi-finished lens blank that is to be used to manufacture a set of optical lenses.

SUMMARY OF THE INVENTION

To this end, the invention proposes a set of ophthalmic lenses, each ophthalmic lens of said set has at a point of optical reference a maximum power and each ophthalmic lens meets an optical performance criterion in standard wearing conditions,
wherein
the range of maximum powers of the set of ophthalmic lenses is greater than or equal to 10 D, and
all the ophthalmic lenses of the set of ophthalmic lenses have been manufactured from a set of semi-finished lens blank, each semi-finished lens blank having the same base curve.

The present invention reduces the semi-finished lens blank inventory/stock by using only one type of semi-finished lens blank lens for a large range of ophthalmic lenses while meeting optical performance criterion.

Advantageously, the present invention reduces the complexity of the ophthalmic lens manufacturing process and reduces the cost of said manufacturing process.

According to further embodiments which can be considered alone or in combination:
- each of the ophthalmic lenses of the set of ophthalmic lenses has an astigmatism amplitude at the point of optical reference greater than or equal to 0 D and smaller than or equal to 4 D and an astigmatism axis comprised between 0 and 180°; and/or
- none of the ophthalmic lenses of the set of ophthalmic lenses is biconvex; and/or
- the range of maximum powers of the set of ophthalmic lenses is greater than or equal to 11 D; and/or
- the range of maximum powers of the set of ophthalmic lenses is greater than or equal to 12 D; and/or
- the range of maximum powers of the set of ophthalmic lenses is greater than or equal to 13 D; and/or
- the range of maximum powers of the set of ophthalmic lenses is greater than or equal to 14 D; and/or
- the range of maximum powers of the set of ophthalmic lenses is greater than or equal to 15 D; and/or
- the range of maximum powers of the set of ophthalmic lenses is greater than or equal to 16 D; and/or
- the range of maximum powers of the set of ophthalmic lenses is greater than or equal to 24 D; and/or
- the lower limit of the range of maximum powers of the set of ophthalmic lenses is greater than or equal to −10 D and the upper limit of the range of maximum powers of the set of ophthalmic lenses is smaller than or equal to +2 D; and/or
- each of the ophthalmic lenses of the set of ophthalmic is a single vision ophthalmic lens; and/or
- each of the ophthalmic lenses of the set of ophthalmic is adapted for the prescription of a wearer; and/or
- the optical performance criterion relates to unwanted astigmatism; and/or
- the optical performance criterion relates to an acuity drop; and/or
- the optical performance criterion relates to power error; and/or
- each semi-finished lens blank has a convex finished surface; and/or
- each semi-finished lens blank has an unfinished rear surface; and/or
- the base curve of each semi-finished lens blank is smaller than or equal to 2.5 D; and/or
- each semi-finished lens blank has a flat finished surface; and/or
- the finished surface of each semi-finished lens blank is non spherical; and/or
- the finished surface of each semi-finished lens blank is rotationally symmetrical; and/or
- the finished surface of each semi-finished lens blank has two axes of symmetry; and/or
- the finished surface of each semi-finished lens blank has no rotational symmetry; and/or
- the finished surface of each semi-finished lens blank is spherical; and/or
- every semi-finished lens blank of the set of semi-finished blank has the same refractive index; and/or
- every semi-finished lens blank of the set of semi-finished blank are identical; and/or each ophthalmic lens of the set of ophthalmic lenses is manufactured with the same manufacturing process.

The invention further relates to a method, for example implemented by computer means, for determining a set of ophthalmic lenses that can be manufactured from a semi-finished lens blank, the method comprising:
- a semi-finished lens blank data providing step, during which semi-finished lens blank data representative of at least the base curve of the semi-finished lens blank is provided,
- an optical performance criterion providing step, during which at least one optical performance criterion is provided,
- an ophthalmic lenses set determining step, during which the set of ophthalmic lenses that:
  - can be manufactured from a semi-finished lens blank corresponding to the semi-finished lens blank data,
  - has the largest range of maximum power at a point of optical reference of the ophthalmic lenses, and
  - meets the optical performance criterion, is determined.

According to a further aspect, the invention relates to a computer program product comprising one or more stored sequence of instruction that is accessible to a processor and which, when executed by the processor, causes the processor to carry out the steps of the methods according to the invention.

According to another aspect the invention relates to a program which makes a computer execute the method of the invention.

The invention also relates to a computer readable medium carrying one or more sequences of instructions of the computer program according to the invention.

The invention further relates to a computer-readable storage medium having a program recorded thereon; where the program makes the computer execute the method of the invention.

The invention relates to a device comprising a processor adapted to store one or more sequence of instructions and to carry out at least one of the steps of a method according to the invention.

The invention also relates to a method of ordering an ophthalmic lens adapted for a wearer from an ophthalmic lens provider, the method comprising:
- wearer data providing step during which wearer data comprising at least the prescription of the wearer are provided,
- a feasibility step during which the feasibility of an ophthalmic lens from a given semi-finished lens blank and corresponding to the wearer data is determined by checking that the ophthalmic lens is within the set of ophthalmic lenses determined by the method for determining a set of ophthalmic lenses according to the invention for said given semi-finished lens blank.

The method of ordering an ophthalmic lens may further comprise a feedback step during which a feedback providing an indication of the result of the feasibility step is sent.

BRIEF DESCRIPTION OF THE DRAWINGS

Non-limiting embodiments of the invention will now be described with reference to the accompanying drawing wherein.

Elements in the figures are illustrated for simplicity and clarity and have not necessarily been drawn to scale. For example, the dimensions of some of the elements in the figure may be exaggerated relative to other elements to help improve the understanding of the embodiments of the present invention.

DETAILED DESCRIPTION OF EMBODIMENTS OF THE INVENTION

The invention relates to a set of ophthalmic lenses each ophthalmic lens of said set has at a point of optical reference a maximum power Pi and each ophthalmic lens meets an optical performance criterion in standard wearing conditions.

In the context of the present invention the term "ophthalmic lens" can refer to an uncut lens or a spectacle lens edged to fit a specific spectacle frame.

The term can also refer to said ophthalmic lens which could present at least one added value such as, for example, tint, polarization filtering, electrochromism, antireflective properties, anti-scratch properties or comprise a photochromic unit or a light guide unit, . . . .

The ophthalmic lens comprises a sphere component and may further comprise a cylinder component. In the context of the present invention, the "maximum power Pi" at a point of optical reference of a given ophthalmic lens may refer to the sphere component alone or may refer to the combination or sum of the sphere component and the cylinder component.

Figure 1:
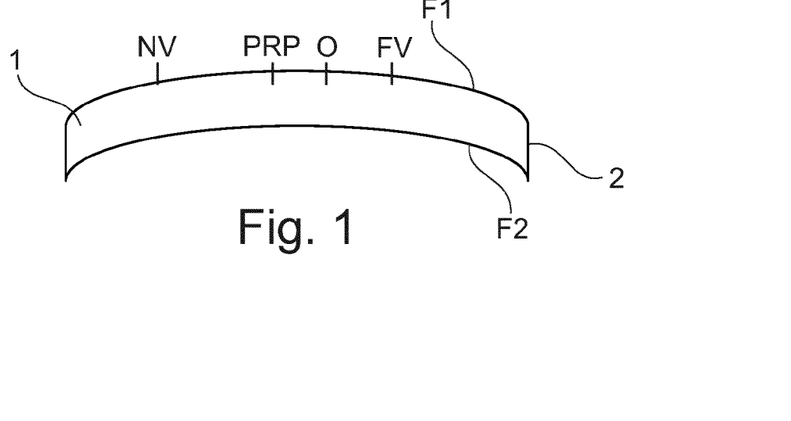
FIG. 1 is a general profile view of an ophthalmic lens.

As represented on FIG. 1 an ophthalmic lens 1 has a first optical face F1 and a second optical face F2. The first and second optical faces are connected by an external periphery surface 2.

Between the first and second optical faces, a refringent transparent medium is constituted which is usually homogenous. The lens can be a finished spectacles eyeglass, the two faces F1 and F2 of which have definitive shapes.

The ophthalmic lenses of the set of ophthalmic lenses may be single vision lenses. A single vision lens is designed to have a single sphero-cylindrical power. When the ophthalmic lens is a single vision lens the point of optical reference may be the control point, for example the fitting cross or prism reference point.

The "fitting cross" is a temporary marking written on the finished surface of a semi-finished lens blank and on the finished surface of an ophthalmic lens. If the temporary markings are absent or have been erased, it is always possible for a skilled person to position the control points on the lens by using a mounting chart, technical documentation from the manufacturer and/or permanent micro-markings when they exist.

The ophthalmic lenses of the set of ophthalmic lenses may be multifocal lenses. A multifocal lens is designed to a more than one power. For example, multifocal lenses include bifocals, trifocals and progressive addition lenses.

When the ophthalmic lens is a progressive addition lens the point of reference may be the far vision control point. When the ophthalmic lens is design for intermediate vision the point of reference may be the near vision control point. For example, the "point of optical reference" also referred to the "prism reference point" may be determined from the position of the fitting cross, for example the optical reference point is located 4 mm below the fitting cross when the lens is progressive addition lens.

Furthermore, when the ophthalmic lens is progressive addition lens at least one of the first and second faces comprises:
- a far vision control point FV,
- a near vision control point NV,
- a main line M starting from one end of the zone of optical interest, ending on the opposite end of the zone of optical interest and passing through the far and near vision control points.

A progressive addition lens comprises at least one but preferably two non-rotationally symmetrical non spherical surfaces, for instance but not limited to, progressive surface, regressive surface, toric or atoric surfaces.

As is known, a minimum curvature $CURV_{min}$ is defined at any point on a non spherical surface by the formula:

$$CURV_{min} = \frac{1}{R_{max}}$$

where $R_{max}$ is the local maximum radius of curvature, expressed in meters and $CURV_{min}$ is expressed in diopters.

Similarly, a maximum curvature $CURV_{max}$ can be defined at any point on a non spheric surface by the formula:

$$CURV_{max} = \frac{1}{R_{min}}$$

where $R_{min}$ is the local minimum radius of curvature, expressed in meters and $CURV_{max}$ is expressed in diopters.

When the surface is non spherical, the local minimum radius of curvature $R_{min}$ and the local maximum radius of curvature $R_{max}$ are different.

From these expressions of the minimum and maximum curvatures $CURV_{min}$ and $CURV_{max}$, the minimum and maximum spheres labeled $SPH_{min}$ and $SPH_{max}$ can be deduced according to the kind of surface considered.

When the surface considered is the object side surface (also referred to as the front surface), the expressions are the following:

$$SPH_{min} = (n-1) * CURV_{min} = \frac{n-1}{R_{max}} \text{ and}$$

$$SPH_{max} = (n-1) * CURV_{max} = \frac{n-1}{R_{min}}$$

where n is the index of the constituent material of the lens.

If the surface considered is an eyeball side surface (also referred to as the back surface), the expressions are the following:

$$SPH_{min} = (1-n) * CURV_{min} = \frac{1-n}{R_{max}} \text{ and}$$

$$SPH_{max} = (1-n) * CURV_{max} = \frac{1-n}{R_{min}}$$

where n is the index of the constituent material of the lens.

Based on the thin lens approximation, considering that the thickness of the lens is very small compared to the radius of curvature, one may consider that the maximum and minimum power are expressed as following:

$$P_{max} \approx SPH_{max,back} + SPH_{max,front}$$

$$P_{min} \approx SPH_{min,back} + SPH_{min,front}$$

As is well known, a mean sphere $SPH_{mean}$ at any point on a non spherical surface can also be defined by the formula:

$$SPH_{mean} = \tfrac{1}{2}(SPH_{min} + SPH_{max})$$

The expression of the mean sphere therefore depends on the surface considered:

if the surface is the object side surface, $$SPH_{mean} = \frac{n-1}{2}\left(\frac{1}{R_{min}} + \frac{1}{R_{max}}\right)$$

if the surface is an eyeball side surface, $$SPH_{mean} = \frac{1-n}{2}\left(\frac{1}{R_{min}} + \frac{1}{R_{max}}\right)$$

A cylinder CYL is also defined by the formula $CYL = |SPH_{max} - SPH_{min}|$.

Based on the thin lens approximation, considering that the thickness of the lens is very small compared to the radius of curvature, one may consider that the mean power is expressed as following:

$$P_{mean} \approx SPH_{mean,back} + SPH_{mean,front}$$

The characteristics of any sur face of the lens may be expressed by the local mean spheres and cylinders.

It can be noticed that when the surface is locally or totally spherical, the local minimum radius of curvature $R_{min}$ and the local maximum radius of curvature $R_{max}$ are the same and, accordingly, the minimum and maximum curvatures $CURV_{min}$ and $CURV_{max}$ are also identical so as the minimum and maximum spheres $SPH_{min}$ and $SPH_{max}$.

Figure 2:
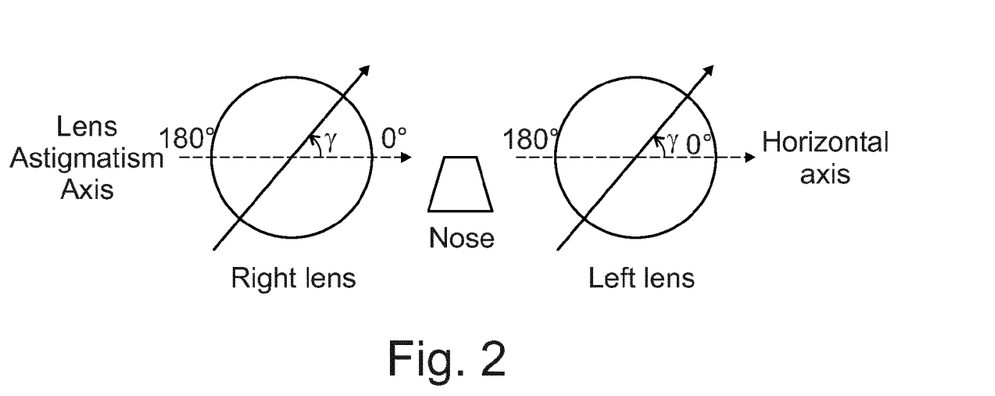
FIG. 2 illustrates the astigmatism axis γ of an ophthalmic lens in the TABO convention.

For a non spherical surface, a local cylinder axis $\gamma_{AX}$ may further be defined. FIG. 2 illustrates the astigmatism axis $\gamma$ as defined in the TABO convention and FIG. 3 illustrates the cylinder axis $\gamma_{AX}$ in a convention defined to characterize a non spherical surface.

The cylinder axis $\gamma_{AX}$ is the angle of the orientation of the maximum curvature $CURV_{max}$ with relation to a reference axis and in the chosen rotation direction. In the above defined convention, the reference axis is horizontal (the angle of this reference axis is 0°) and the rotation direction is counterclockwise for each eye, when looking at the wearer ($0° \leq \gamma_{AX} \leq 180°$). An axis value for the cylinder axis $\gamma_{AX}$ of +45° therefore represents an axis oriented obliquely, which when looking at the wearer, extends from the quadrant located up on the right to the quadrant located down on the left.

Figure 3:
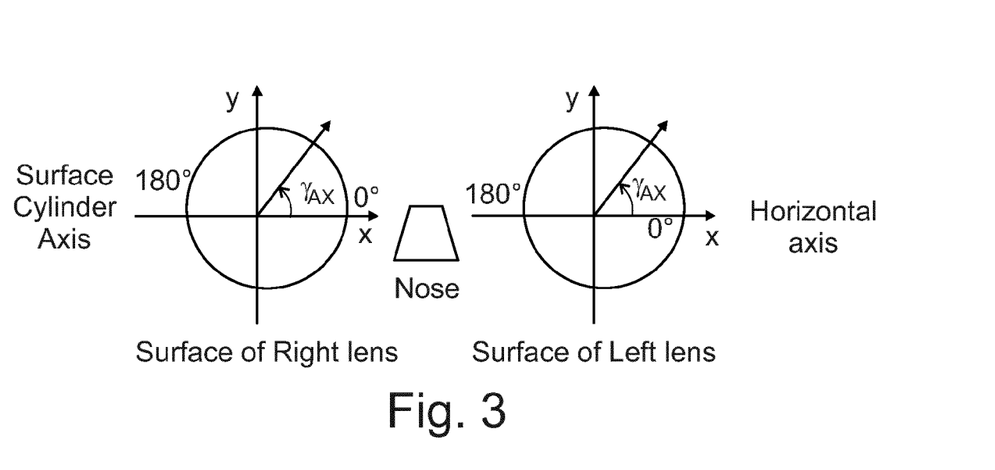
FIG. 3 illustrates the cylinder axis γAX in a convention used to characterize a non spherical surface.
Figure 4:
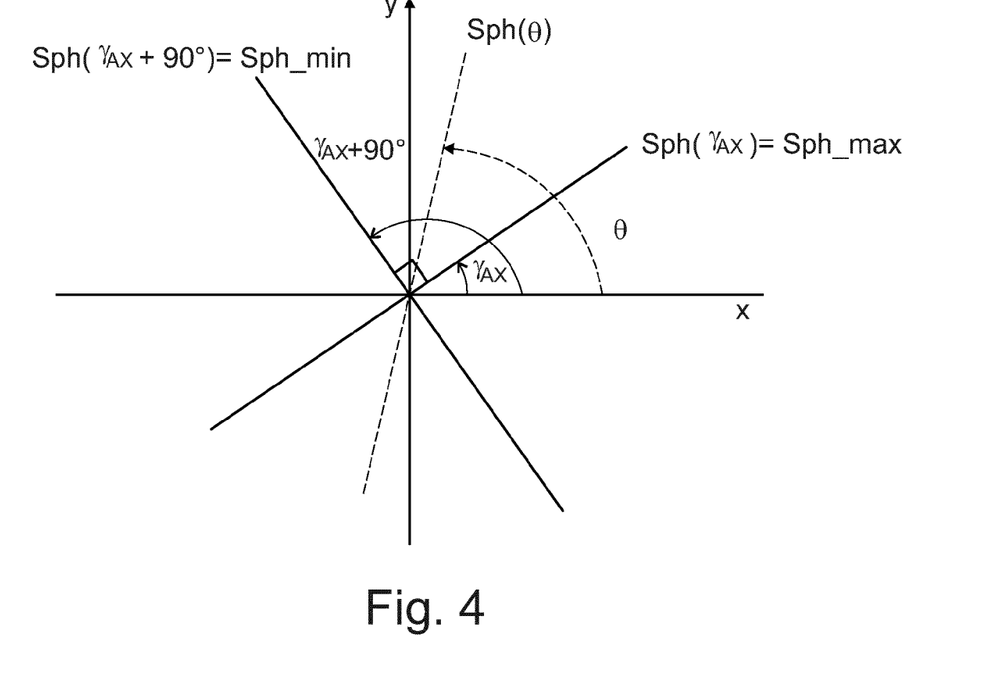
FIG. 4 illustrates the local sphere along any axis at a point on a surface.

In addition, based on the knowledge of the value of the local cylinder axis $\gamma_{AX}$, Gauss formula enables to express the local sphere SPH along any axis θ, θ being a given angle in the referential defined in FIG. 3. The axis θ is shown in FIG. 4.

$$SPH(\theta)=SPH_{max}\cos^2(\theta-\gamma_{AX})+SPH_{min}\sin^2(\theta-\gamma_{AX})$$

As expected, when using the Gauss formula, $SPH(\gamma_{AX})=SPH_{max}$ and $SPH(\gamma_{AX}+90°)=SPH_{min}$.

The Gauss formula can also be expressed in term of curvature so that the curvature CURV along each axis forming an angle θ with the horizontal axis by:

$$CURV(\theta)=CURV_{max}\cos^2(\theta-\gamma_{AX})+CURV_{min}\sin^2(\theta-\gamma_{AX})$$

A surface may thus be locally defined by a triplet constituted by the maximum sphere $SPH_{max}$, the minimum sphere $SPH_{min}$ and the cylinder axis $\gamma_{AX}$. Alternatively, the triplet may be constituted by the mean sphere $SPH_{mean}$, the cylinder CYL and the cylinder axis $\gamma_{AX}$.

Figure 5:
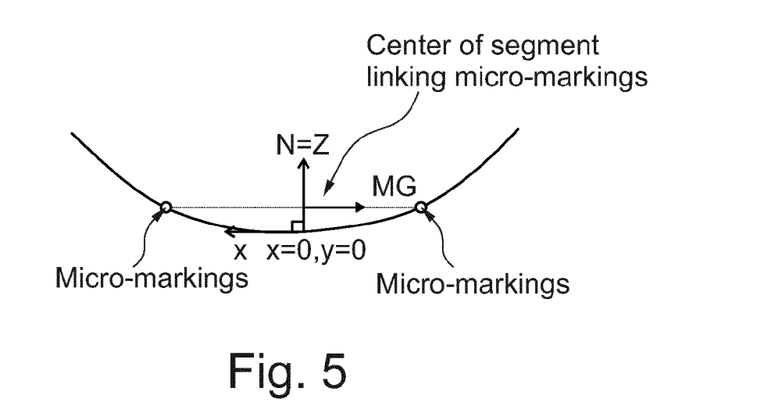
FIGS. 5 and 6a show referential defined with respect to micro-markings, for a surface bearing micro-markings and for a surface not bearing the micro-markings respectively.

Whenever a lens is characterized by reference to one of its aspherical surfaces, a referential is defined with respect to micro-markings as illustrated in FIGS. 5 and 6, for a surface bearing micro-markings and for a surface not bearing the micro-markings respectively.

Progressive lenses comprise micro-markings that have been made mandatory by a harmonized standard ISO 8980-2. Temporary markings may also be applied on the surface of the lens, indicating diopter measurement positions (sometimes referred to as control points) on the lens, such as for far vision FV and for near vision NV, a prism reference point PRP and a fitting cross O for instance, as represented schematically in FIG. 1. It should be understood that what is referred to herein by the terms far vision control point and near vision control point can be any one of the points included in the orthogonal projection on the first surface of the lens, of respectively the FV and NV temporary markings provided by the lens manufacturer. If the temporary markings are absent or have been erased, it is always possible for a skilled person to position such control points on the lens by using a mounting chart and the permanent micro-markings.

The micro-markings also make it possible to define a coordinate system for both surfaces of the ophthalmic lens.

FIG. 5 illustrates a coordinate system for the surface bearing the micro-markings. The center of the surface (x=0, y=0) is the point of the surface at which the normal N to the surface intersects the center of the segment linking the two micro-markings. MG is the collinear unitary vector defined by the two micro-markings. Vector Z of the referential is equal to the unitary normal (Z=N); vector Y of the referential is equal to the vector product of Z by MG; vector X of the referential is equal to the vector product of Y by Z. {X, Y, Z} thereby form a direct orthonormal trihedral. The center of the referential is the center of the surface x=0 mm, y=0 mm. The X axis is the horizontal axis and the Y axis is the vertical axis as it shown in FIG. 3.

Figure 6A:
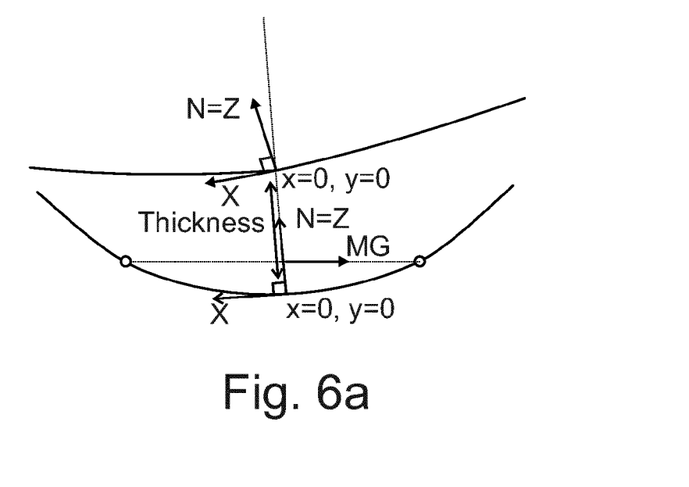

FIG. 6a illustrates a coordinate system for the surface opposite to the surface bearing the micro-markings. The center of this second surface (x=0, y=0) is the point at which the normal N intersecting the center of the segment linking the two micro-markings on the first surface intersects the second surface. Referential of the second surface is constructed the same way as the referential of the first surface, i.e. vector Z is equal to the unitary normal of the second surface; vector Y is equal to the vector product of Z by MG; vector X is equal to the vector product of Y by Z. As for the first surface, the X axis is the horizontal axis and the Y axis is the vertical axis as it shown in FIG. 3. The center of the referential of the surface is also x=0 mm, y=0 mm.

Moreover, a progressive multifocal lens may also be defined by optical characteristics, taking into consideration the situation of the person wearing the lenses.

Figure 6B:
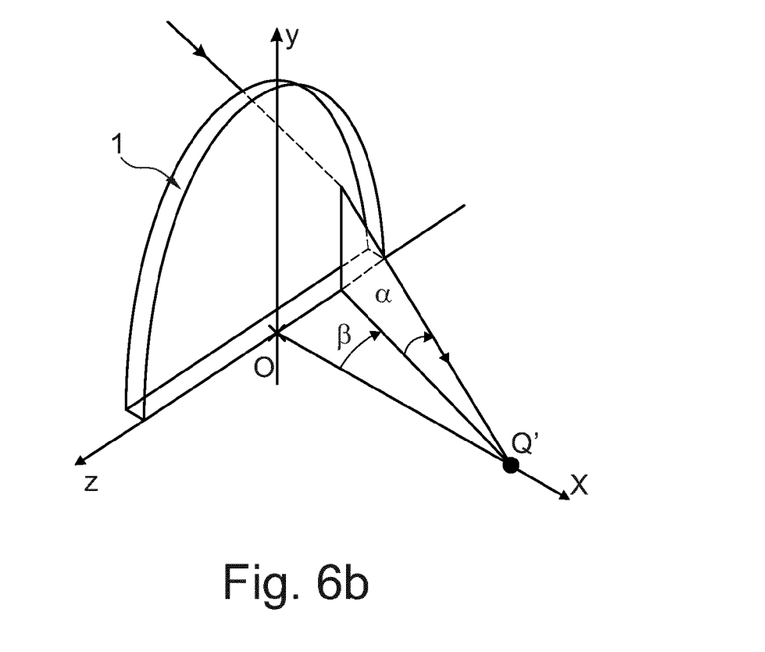
FIGS. 6b and 6c show, diagrammatically, optical systems of eye and ophthalmic lens.
Figure 6C:
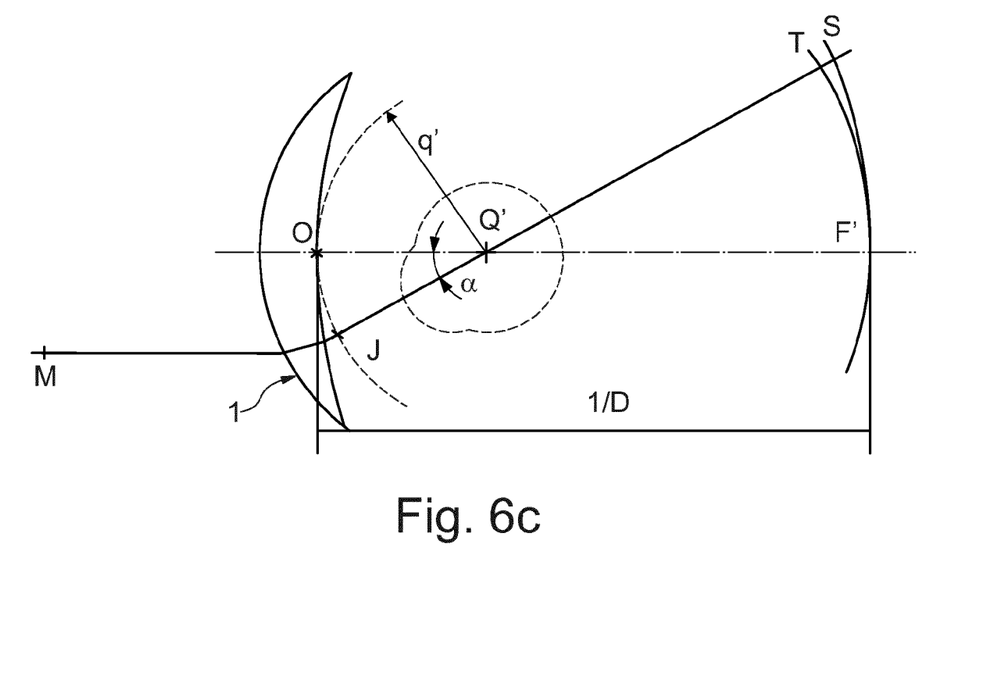

FIGS. 6b and 6c are diagrammatic illustrations of optical systems of eye and lens, thus showing the definitions used in the description. More precisely, FIG. 6b represents a perspective view of such a system illustrating parameters α and β used to define a gaze direction. FIG. 6c is a view in the vertical plane parallel to the antero-posterior axis of the wearer's head and passing through the center of rotation of the eye in the case when the parameter β is equal to 0.

The center of rotation of the eye is labeled Q'. The axis Q'F', shown on FIG. 6c in a dot-dash line, is the horizontal axis passing through the center of rotation of the eye and extending in front of the wearer—that is the axis Q'F' corresponding to the primary gaze view. This axis cuts the front surface of the lens on a point called the fitting cross, which is present on lenses to enable the positioning of lenses in a frame by an optician. The point of intersection of the rear surface of the lens and the axis Q'F' is the point O. O can be the fitting cross if it is located on the rear surface. An apex sphere, of center Q', and of radius q', is tangential to the rear surface of the lens in a point of the horizontal axis. As examples, a value of radius q' of 25.5 mm corresponds to a usual value and provides satisfying results when wearing the lenses.

A given gaze direction—represented by a solid line on FIG. 6b—corresponds to a position of the eye in rotation around Q' and to a point J of the apex sphere; the angle β is the angle formed between the axis Q'F' and the projection of the straight line Q'J on the horizontal plane comprising the axis Q'F'; this angle appears on the scheme on FIG. 6b. The angle α is the angle formed between the axis Q'J and the projection of the straight line Q'J on the horizontal plane comprising the axis Q'F'; this angle appears on the scheme on FIGS. 6b and 6c. A given gaze view thus corresponds to a point J of the apex sphere or to a couple (α, β). The more the value of the lowering gaze angle is positive, the more the gaze is lowering and the more the value is negative, the more the gaze is rising.

In a given gaze direction, the image of a point M in the object space, located at a given object distance, is formed between two points S and T corresponding to minimum and maximum distances JS and JT, which would be the sagittal and tangential local focal lengths. The image of a point in the object space at infinity is formed, at the point F'. The distance D corresponds to the rear frontal plane of the lens.

Ergorama is a function associating to each gaze direction the usual distance of an object point. Typically, in far vision following the primary gaze direction, the object point is at infinity. In near vision, following a gaze direction essentially corresponding to an angle α of the order of 35° and to an angle β of the order of 5° in absolute value toward the nasal side, the object distance is of the order of 30 to 50 cm. For more details concerning a possible definition of an ergorama, U.S. Pat. No. 6,318,859 may be considered. This document describes an ergorama, its definition and its modeling method. For a method of the invention, points may be at infinity or not. Ergorama may be a function of the wearer's ametropia.

Using these elements, it is possible to define a wearer optical power and astigmatism, in each gaze direction. An object point M at an object distance is considered for a gaze direction (α,β). An object proximity ProxO is defined for the point M on the corresponding light ray in the object space as the inverse of the distance MJ between point M and point J of the apex sphere:

ProxO=1/MJ

This enables to calculate the object proximity within a thin lens approximation for all points of the apex sphere. For a real lens, the object proximity can be considered as the inverse of the distance between the object point and the front surface of the lens, on the corresponding light ray.

For the same gaze direction ($\alpha,\beta$), the image of a point M having a given object proximity is formed between two points S and T which correspond respectively to minimal and maximal focal distances (which would be sagittal and tangential focal distances). The quantity ProxI is called image proximity of the point M:

$$ProxI = \frac{1}{2}\left(\frac{1}{JT} + \frac{1}{JS}\right)$$

By analogy with the case of a thin lens, it can therefore be defined, for a given gaze direction and for a given object proximity, i.e. for a point of the object space on the corresponding light ray, an optical power Pui as the sum of the image proximity and the object proximity.

Pui=ProxO+ProxI

With the same notations, an astigmatism Ast is defined for every gaze direction and for a given object proximity as:

$$Ast = \left|\frac{1}{JT} - \frac{1}{JS}\right|$$

This definition corresponds to the astigmatism of a ray beam created by the lens. It can be noticed that the definition gives, in the primary gaze direction, the classical value of astigmatism. The astigmatism angle, usually called axis, is the angle $\gamma$. The angle $\gamma$ is measured in the frame {Q', $x_m$, $y_m$, $z_m$} linked to the eye. It corresponds to the angle with which the image S or T is formed depending on the convention used with relation to the direction $z_m$ in the plane {Q', $z_m$, $y_m$}.

Possible definitions of the optical power and the astigmatism of the lens, in the wearing conditions, can thus be calculated as explained in the article by B. Bourdoncle et al., entitled "Ray tracing through progressive ophthalmic lenses", 1990 International Lens Design Conference, D. T. Moore ed., Proc. Soc. Photo. Opt. Instrum. Eng.

Standard or usual wearing conditions are to be understood as the position of the lens with relation to the eye of a standard wearer, notably defined with the fitting cross intersecting the primary viewing direction, a distance between the center of rotation of the eye and the first major surface of the lens of 25.5 mm, a pantoscopic angle of 8° and a wrap angle of 0°.

The pantoscopic angle is the angle in the vertical plane between the optical axis of the spectacle lens and the visual axis of the eye in the primary position, usually taken to be the horizontal.

The wrap angle is the angle in the horizontal plane between the optical axis of the spectacle lens and the visual axis of the eye in the primary position, usually taken to be the horizontal.

Other conditions may be used. Wearing conditions may be calculated from a ray-tracing program, for a given lens.

Further, the optical power and the astigmatism may be calculated so that the prescription is either fulfilled at the reference points (i.e control points in far vision) and for a wearer wearing his spectacles in the wearing conditions or measured by a frontofocometer.

Figure 6D:
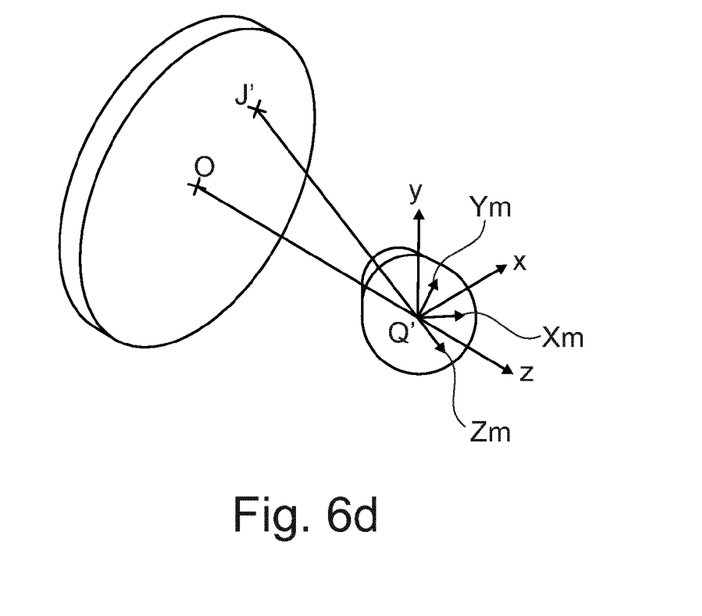
FIG. 6d shows a ray tracing from the center of rotation of the eye.

FIG. 6d represents a perspective view of a configuration wherein the parameters $\alpha$ and $\beta$ are non zero. The effect of rotation of the eye can thus be illustrated by showing a fixed frame {x, y, z} and a frame {$x_m$, $y_m$, $z_m$} linked to the eye. Frame {x, y, z} has its origin at the point Q'. The axis x is the axis Q'O and it is oriented from the lens toward the eye. The y axis is vertical and oriented upwardly. The z axis is such that the frame {x, y, z} be orthonormal and direct. The frame {$x_m$, $y_m$, $z_m$} is linked to the eye and its center is the point Q'. The $x_m$ axis corresponds to the gaze direction J'Q'. Thus, for a primary gaze direction, the two frames {x, y, z} and {$x_m$, $y_m$, $z_m$} are the same.

It is known that the properties for a ophthalmic lens may be expressed in several different ways and notably in surface and optically. A surface characterization is thus equivalent to an optical characterization.

Indeed, both characterizations enabling to describe the same object from two different points of view. Whenever the characterization of the lens is of optical kind, it refers to an ergorama-eye-lens system. For simplicity, the term 'ophthalmic lens' is used in the description but it has to be understood as the 'ergorama-eye-lens system'. The value in surface terms can be expressed with relation to points. The points are located with the help of abscissa or ordinate in a frame as defined above with respect to FIGS. 3, 5 and 6a.

The values in optic terms can be expressed for gaze directions. Gaze directions are usually given by their degree of lowering and azimuth in a frame whose origin is the center of rotation of the eye. When the lens is mounted in front of the eye, a point called the fitting cross is placed before the pupil or before the eye rotation center Q' of the eye for a primary gaze direction. The primary gaze direction corresponds to the situation where a wearer is looking straight ahead. In the chosen frame, the fitting cross corresponds thus to a lowering angle $\alpha$ of 0° and an azimuth angle $\beta$ of 0° whatever surface of the lens the fitting cross is positioned—rear surface or front surface.

The above description made with reference to FIGS. 6b-6d was given for central vision. In peripheral vision, as the gaze direction is fixed, the center of the pupil is considered instead of center of rotation of the eye and peripheral ray directions are considered instead of gaze directions. When peripheral vision is considered, angle $\alpha$ and angle $\beta$ correspond to ray directions instead of gaze directions.

In the reminder of the description, terms like «up», «bottom», «horizontal», «vertical», «above», «below», «front», «rear» or other words indicating relative position may be used. These terms are to be understood in the wearing conditions of the lens.

Notably, the "upper" part of the lens corresponds to a negative lowering angle $\alpha<0°$ and the "lower" part of the lens corresponds to a positive lowering angle $\alpha>0°$. Similarly, the "upper" part of the surface of a lens—or of a semi-finished lens blank—corresponds to a positive value along the y axis, and preferably to a value along the y axis superior to the y value at the fitting cross and the "lower" part of the surface of a lens—or of a semi-finished lens blank—corresponds to a negative value along the y axis in the frame as defined above with respect to FIGS. 3, 6a and 6b, and preferably to a value along the y axis inferior to the y value at the fitting cross.

The set of ophthalmic lenses of the invention is characterized by having a range of maximum powers of the set of ophthalmic lenses greater than or equal to 10 D, for example greater than or equal to 16 D, for example greater than or equal to 24 D.

In other words, the greatest difference of maximum power at the point of optical reference over all the set of ophthalmic lenses is greater than or equal to 10 D, for example greater than or equal to 16 D, for example greater than or equal to 24 D.

According to an embodiment, the lower limit of the range of maximum powers of the set of ophthalmic lenses is greater than or equal to −10 D, for example greater than or equal to −12 D, −16 D or −20 D and the upper limit of the range of maximum powers of the set of ophthalmic lenses is smaller than or equal to +2 D for example smaller than or equal to +4 D, +8 D or +12 D.

As illustrated on FIG. 1, preferably, none of the ophthalmic lenses of the set of ophthalmic lenses is biconvex. An ophthalmic lens is biconvex if both surfaces are convex.

Typically, as represented on FIG. 1, the surface of the first optical face F1 is convex and the surface of the second optical face F2 is concave.

According to an embodiment, the each of the ophthalmic lenses of the set of ophthalmic lenses has an astigmatism amplitude at the point of optical reference greater than or equal to 0 D and smaller than or equal to 4 D and an astigmatism axis comprised between 0 and 180°.

According to the invention each ophthalmic lens of the set of ophthalmic lenses meets at least one optical performance criterion.

Preferably, all the ophthalmic lenses of the set of ophthalmic lenses meet at least a common optical performance criterion.

The optical performance criterion may be global. In other words, the optical performance criterion is evaluated over a portion or zone of the ophthalmic lens. For example, the optical performance criterion is evaluated over a set of gaze directions comprised in a right circular cone of the gaze directions. The right circular cone of gaze directions is defined by an axis comprising the centre of rotation of the eye of the wearer in standard wearing conditions and the fitting cross of the ophthalmic lens and an angle of 30°. A "Root Mean Square" also referred to as RMS, or a difference of RMS or RMS normalized to the addition is provided to estimate the optical performance criterion.

The optical performance criterion may be local. In other words, the optical performance criterion is evaluated at a specific point or at a list of specific points of the ophthalmic lens.

The local optical performance criteria may be estimated for example at the prism reference point, the fitting cross, the far vision reference point, the near vision reference point.

The local criterion may be compared to a reference value.

For example, each ophthalmic lens of the set of ophthalmic is adapted for the prescription of a wearer. In other words, each specific ophthalmic lens of the set of ophthalmic lenses is designed to fit the prescription of a specific wearer, however two ophthalmic lenses of the set may not be designed to fit the same prescription.

The term "prescription" is to be understood to mean a set of optical characteristics of optical power, of astigmatism, of prismatic deviation, and, where relevant, of addition, determined by an ophthalmologist or optometrist in order to correct the vision defects of the wearer, for example by means of a lens positioned in front of his eye. For example, the prescription for a progressive addition lens comprises values of optical power and of astigmatism with an axis for the distance vision and, where appropriate, an addition value. The prescription data may include data for emmetrope eyes.

The adaptation of an ophthalmic lens to the prescription of a wearer is to be checked at least at the point of optical reference of each ophthalmic lens.

The optical performance criteria may relate, for example be, unwanted astigmatism in a control gaze direction or over a control zone. Unwanted astigmatism corresponds to the difference between the astigmatism of the ophthalmic lens and the prescribed "cylinder".

The control gaze direction may for a single vision ophthalmic lens correspond to direction corresponding to an angle α of −30° and an angle β of 0° from the point of optical reference. Preferably, the unwanted astigmatism is said control gaze direction is smaller than or equal to 1.12 D.

The control gaze direction may for a progressive addition lens correspond to the direction of the point of optical reference or to a direction corresponding to an angle α of −12° and an angle β of 0° from the point of optical reference and/or to the direction corresponding to the near vision control point. Preferably, the unwanted astigmatism in the direction corresponding to an angle α of −12° and an angle β of 0° from the point of optical reference is smaller than or equal to 0.46 D and the unwanted astigmatism in the direction corresponding to the near vision control point is smaller than or equal to 0.83 D.

The unwanted astigmatism may also be controlled as a global criterion.

For example, the Root Mean Square of unwanted astigmatism may be smaller than or equal to 0.59 D for a single vision ophthalmic lens.

The RMS normalized to the addition of unwanted astigmatism may be smaller than or equal to 0.58 D for a progressive addition lens.

The optical performance criteria may alternatively or additionally relate to, for example be, the acuity drop of each of the ophthalmic lenses of the set of ophthalmic in a control gaze direction or over a control zone.

The acuity drop may be estimated using the decimal logarithm of relative acuity given by Fauquier's model as defined in C Fauquier, T Bonnin, C Miege, and E Roland. *"Influence of combined power error and astigmatism on visual acuity"*—Vision Science and Its Applications, OSA Technical Digest Series. Washington, D.C.: Optical Society of America, pages 151-4, 1995.

The control gaze direction may for a single vision ophthalmic lens correspond to direction corresponding to an angle α of −30° and an angle β of 0° from the point of optical reference. Preferably in said control gaze direction the acuity drop may be smaller than or equal to 0.25.

The control gaze direction may for a progressive addition lens correspond to the direction of the point of optical reference or to a direction corresponding to an angle α of −12° and an angle β of 0° from the far vision control point and/or to the direction corresponding to the near vision control point. The acuity drop in a direction corresponding to an angle α of 12° and an angle β of 0° from the far vision control is preferably smaller than or equal to 0.17 and for a direction corresponding to the near vision control point is preferably smaller than or equal to 0.27.

The acuity drop may also be controlled as a global criterion.

For example, the Root Mean Square of acuity drop may be smaller than or equal to 0.15 for a single vision ophthalmic lens.

Root Mean Square of acuity drop may be smaller than or equal to 0.5 for a progressive addition lens.

The optical performance criteria may alternatively or additionally relate, for example be, a power error of each ophthalmic lenses of the set of ophthalmic in a control gaze direction or over a control zone Power error corresponds to the difference between the optical power of the ophthalmic lens and the prescribed "sphere".

The power error being determined compared to the wearer's prescription.

The control gaze direction may for a single vision ophthalmic lens correspond to direction corresponding to an angle α of −30° and an angle β of 0° from the point of optical reference. Preferably, the power error is said control gaze direction is smaller than or equal to 0.6 D.

The control gaze direction may for a progressive addition lens correspond to the direction of the point of optical reference or to a direction corresponding to an angle α of −12° and an angle β of 0° from the point of optical reference and/or to the direction corresponding to the near vision control point. Preferably, the power error in the direction corresponding to an angle α of −12° and an angle β of 0° from the point of optical reference is smaller than or equal to 0.16 D.

The power error may also be controlled as a global criterion.

For example, the difference between the power and the Root Mean Square of power may be smaller than or equal to 0.19 D for a single vision ophthalmic lens.

The set of ophthalmic lenses of the invention is further characterized by having all the ophthalmic lenses of the set of ophthalmic lenses manufactured from a set of semi-finished lens blank, each semi-finished lens blank having the same base curve.

The base curve of a semi-finished lens blank corresponds to the mean sphere $SPH_{mean}$ at the point of reference of the finished surface of the semi-finished lens blank considering an index n of 1.53:

$$SPH_{mean} = \frac{0.53}{2}\left(\frac{1}{R_{min}} + \frac{1}{R_{max}}\right)$$

According to an embodiment of the invention the base curve of each semi-finished lens blank is smaller than or equal to 2.5 D. For example, each semi-finished lens blank has a flat finished surface.

Figure 7:
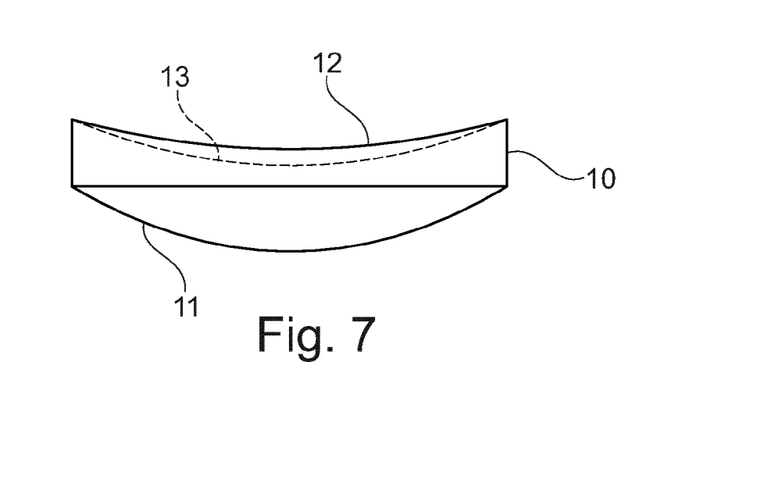
FIG. 7 is general profile view of a semi-finished lens blank.

As illustrated on FIG. 7, a semi-finished lens blank 10 has a preformed front surface 11 that, in use of the resulting finished optical lens, is disposed nearest the object being viewed and an opposing surface 12 to be modified by the manufacturing process to provide the back surface 13 of the finished optical lens, represented by the dotted line.

Opposing surface 12 is machined by a machining tool so that the back surface 13 is orientated with respect to and distanced from the front surface 12, according to the required optical prescription.

Preferably as illustrated in FIG. 7, the back or rear surface of the optical lens is formed by the machining process.

Preferably, each semi-finished lens blank used to manufacture the ophthalmic lenses of the set of ophthalmic lenses have a convex finished surface.

Depending on the type of ophthalmic lens to be manufactured, the finished surface of each semi-finished lens blank may be aspherical and/or rotationally symmetrical and/or toric.

Alternatively, the finished surface of each semi-finished lens blank may have no rotational symmetry or may be spherical.

Preferably, to reduce storage cost and the complexity of the manufacturing process every semi-finished lens blank of the set of semi-finished blank has the same refractive index n, for example a refractive index greater than or equal to 1.5 and smaller than or equal to 1.9, for example smaller than or equal to 1.7, for example equal to 1.6 or to 1.67.

So as to make the manufacturing process as simple as possible, every semi-finished lens blank of the set of semi-finished blank are identical.

Preferably, the same manufacturing process is used to manufacture all the ophthalmic lenses of the set of ophthalmic lenses.

The invention further relates to a method, for example implemented by computer means, for determining a set of ophthalmic lenses that can be manufactured from a semi-finished lens blank.

Figure 8:
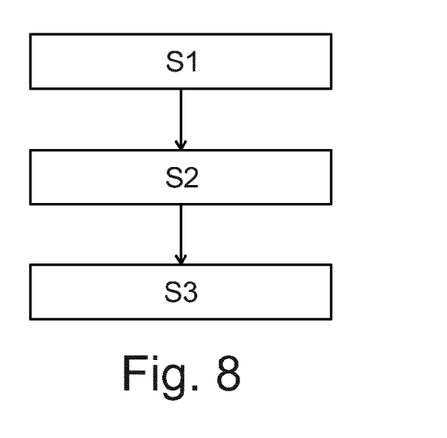
FIG. 8 is a flowchart of a method for determining a set of ophthalmic lenses according to the invention.

As illustrated on FIG. 8, the method of the invention comprises at least:
  a semi-finished lens blank data providing step S1,
  an optical performance criterion providing step S2,
  an ophthalmic lenses set determining step S3.

Semi-finished lens blank data representative of at least the base curve of the semi-finished lens blank is provided during the semi-finished lens blank data providing step S1.

At least one at least one optical performance criterion, for example the optical performance criteria illustrated when describing the set of ophthalmic lenses, is provided during the optical performance criterion providing step S2.

The set of ophthalmic lenses is determined during the ophthalmic lenses set determining step S3.

The set of ophthalmic lenses is determined so that each ophthalmic lens of said set of ophthalmic lenses:
  can be manufactured from a semi-finished lens blank corresponding to the semi-finished lens blank data,
  has the largest range of maximum power at a point of optical reference of the ophthalmic lenses, for example at least greater than 10 D, and
  meets the optical performance criterion.

The semi-finished lens blank and the ophthalmic lenses of the set of ophthalmic lenses may comprise some or any possible combination of features illustrated when describing the set of ophthalmic lenses.

The invention further relates to a method of ordering an ophthalmic lens adapted for a wearer from an ophthalmic lens provider.

Figure 9:
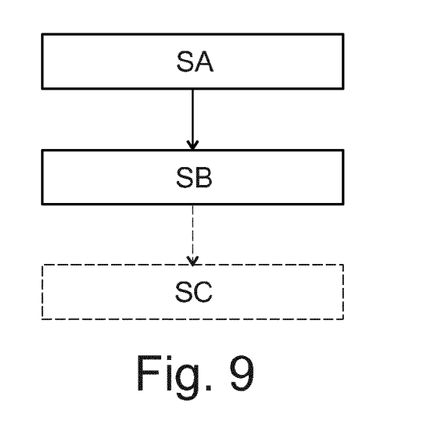
FIG. 9 is a flowchart of a method of ordering an ophthalmic lens according to the invention.

As illustrated on FIG. 9 the ordering method of the invention comprises at least:
  a wearer data providing step SA, and
  a feasibility step SB.

The prescription of the wearer is provided during the wearer date providing step SA.

Further data relating to the wearer may be provided during the wearer data providing step such as data relating to the morphology of the wearer and/or the shape of the spectacle frame chosen by the wearer.

The feasibility of an ophthalmic lens from a given semi-finished lens blank and corresponding to the wearer data is determined during the feasibility step SB.

The feasibility may be determined by checking that the ophthalmic lens is within the set of ophthalmic lenses determined by the method according to the invention for said given semi-finished lens blank.

Advantageously, the ordering method of the invention may be used to determine if a specific ophthalmic lens manufacturing lab that would have only one type of semi-finished lens blank may manufacture a specific ophthalmic lens adapted to a wearer.

The ordering method of the invention may further comprise a feedback step SC during which a feedback providing an indication of the result of the feasibility step is sent. The feedback may be send to the ordering party and/or to a third party that may manage manufacturing process so as to send the order to another manufacturing lab is the feedback indicates the ophthalmic lenses may not be manufactured from the given semi-finished lens blank.

The invention has been described above with the aid of embodiments without limitation of the general inventive concept.

Many further modifications and variations will be apparent to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A set of ophthalmic lenses each ophthalmic lens of said set having, at a point of optical reference, a maximum power and each ophthalmic lens meeting an optical performance criterion in standard wearing conditions,
wherein
the range of maximum powers of the set of ophthalmic lenses is greater than or equal to 10 D, and
all the ophthalmic lenses of the set of ophthalmic lenses have been manufactured from a set of semi-finished lens blanks, each semi-finished lens blank having the same base curve,
wherein the lower limit of the range of maximum powers of the set of ophthalmic lenses is greater than or equal to −10D and the upper limit of the range of maximum powers of the set of ophthalmic lenses is smaller than or equal to +2D.

2. The set of ophthalmic lenses according to claim 1, wherein each of the ophthalmic lenses of the set of ophthalmic lenses has an astigmatism amplitude at the point of optical reference greater than or equal to 0D and smaller than or equal to 4D and an astigmatism axis comprised between 0 and 180°.

3. The set of ophthalmic lenses according to claim 1, wherein none of the ophthalmic lenses of the set of ophthalmic lenses is biconvex.

4. The set of ophthalmic lenses according to claim 1, wherein each of the ophthalmic lenses of the set of ophthalmic is a single vision ophthalmic lens.

5. The set of ophthalmic lenses according to claim 1, wherein each of the ophthalmic lenses of the set of ophthalmic is adapted for the prescription of a wearer.

6. The set of ophthalmic lenses according to claim 5, wherein the optical performance criterion relates to an acuity drop.

7. The set of ophthalmic lenses according to claim 5, wherein the optical performance criterion relates to a power error.

8. The set of ophthalmic lenses according to claim 1, wherein the base curve of each semi-finished lens blank is smaller than or equal to 2.5 D.

9. The set of ophthalmic lenses according to claim 1, wherein each semi-finished lens blank has a flat finished surface.

10. The set of ophthalmic lenses according to claim 1, wherein the finished surface of each semi-finished lens blank is non spherical.

11. The set of ophthalmic lenses according to claim 1, wherein the finished surface of each semi-finished lens blank is rotationally symmetrical.

12. The set of ophthalmic lenses according to claim 1, wherein every semi-finished lens blank of the set of semi-finished blank are identical.

13. A method implemented by a computer for determining a set of ophthalmic lenses that is manufacturable from a semi-finished lens blank, the method comprising:
providing semi-finished lens blank data representative of at least the base curve of the semi-finished lens blank;
providing at least one optical performance criterion; and
determining the set of ophthalmic lenses that:
is manufacturable from a semi-finished lens blank corresponding to the semi-finished lens blank data,
has a greatest range of maximum power at a point of optical reference of the ophthalmic lenses, and
meets the optical performance criterion,
wherein the lower limit of the range of maximum powers of the set of ophthalmic lenses is greater than or equal to −10D and the upper limit of the range of maximum powers of the set of ophthalmic lenses is smaller than or equal to +2D.

14. A method of causing a prescription ophthalmic lens to be adapted for a wearer from an ophthalmic lens provider, the method comprising:
providing wearer data including at least the prescription of the wearer; and
determining a feasibility of a prescription ophthalmic lens from a given semi-finished lens blank by checking whether a semi-finished lens blank, which is usable to produce the prescription ophthalmic lens based on the provided wearer data and adapted for the wearer, is within the set of ophthalmic lenses determined by the method of claim 13 and, when such prescription ophthalmic lens is producible, causing the prescription ophthalmic lens to be adapted for the wearer using the semi-finished lens within the set of ophthalmic lenses.

* * * * *